(12) United States Patent　　(10) Patent No.: US 12,381,422 B2
Nugent, Jr. et al.　　(45) Date of Patent: Aug. 5, 2025

(54) SAFE POWER BEAM STARTUP

(71) Applicant: LASERMOTIVE, INC., Kent, WA (US)

(72) Inventors: Thomas J. Nugent, Jr., Bellevue, WA (US); Thomas W. Bashford, Renton, WA (US); David Bashford, Kent, WA (US); Alexander Hay, Bellevue, WA (US)

(73) Assignee: Laser Motive, Inc., Kent, WA (US)

( * ) Notice: Subject to any disclaimer, the term of this patent is extended or adjusted under 35 U.S.C. 154(b) by 0 days.

(21) Appl. No.: 17/613,021

(22) PCT Filed: May 21, 2020

(86) PCT No.: PCT/US2020/034104
§ 371 (c)(1),
(2) Date: Nov. 19, 2021

(87) PCT Pub. No.: WO2020/237107
PCT Pub. Date: Nov. 26, 2020

(65) Prior Publication Data
US 2022/0224165 A1　　Jul. 14, 2022

Related U.S. Application Data

(60) Provisional application No. 62/851,033, filed on May 21, 2019.

(51) Int. Cl.
*H02J 50/30*　　(2016.01)
*H02J 50/40*　　(2016.01)
(Continued)

(52) U.S. Cl.
CPC .............. *H02J 50/30* (2016.02); *H02J 50/40* (2016.02); *H02S 40/38* (2014.12); *H04B 10/807* (2013.01)

(58) Field of Classification Search
CPC ........... H02J 50/30; H02J 50/40; H02S 40/38; H04B 10/807; G01V 8/20
See application file for complete search history.

(56) References Cited

U.S. PATENT DOCUMENTS

| 11,289,946 B2 * | 3/2022 | Abdelraheem | ....... H02J 50/001 |
| 2002/0089727 A1 * | 7/2002 | Alwan | ................... H04B 10/40 398/192 |
| 2003/0075670 A1 * | 4/2003 | Tuominen | ............ H04B 10/807 250/205 |

(Continued)

OTHER PUBLICATIONS

"International Search Report Issued in PCT Application No. PCT/US20/34104", Mailed Date: Aug. 28, 2020, 10 Pages.

*Primary Examiner* — Daniel Kessie
*Assistant Examiner* — Brian K Baxter

(57) ABSTRACT

A remote power system includes a remote power transmitter arranged to output a power beam in a startup mode and a remote power receiver arranged to receive the power beam. The remote power receiver has a plurality of photovoltaic (PV) cells (or other power converters) mounted to generate electrical power from energy in the power beam, startup power monitoring (SPM) logic to determine, based on electrical power generated by each of the plurality of PV cells, whether or not the remote power transmitter can operate in a high-flux mode, and a receiver-based transmitter circuit arranged to communicate an indication that the remote power transmitter can operate in the high-flux mode.

20 Claims, 8 Drawing Sheets

(51) Int. Cl.
*H02S 40/38* (2014.01)
*H04B 10/80* (2013.01)

(56) References Cited

U.S. PATENT DOCUMENTS

| | | | | |
|---|---|---|---|---|
| 2004/0227057 | A1* | 11/2004 | Tuominen | H04B 10/807 250/221 |
| 2006/0266917 | A1 | 11/2006 | Baldis et al. | |
| 2009/0016715 | A1* | 1/2009 | Furey | H04B 10/807 398/38 |
| 2010/0012819 | A1* | 1/2010 | Graham | H02J 50/30 250/237 R |
| 2010/0078995 | A1* | 4/2010 | Hyde | H02J 50/40 307/11 |
| 2012/0007445 | A1* | 1/2012 | Hyde | H02J 50/90 307/149 |
| 2015/0207333 | A1* | 7/2015 | Baarman | H02J 50/001 307/104 |
| 2015/0236757 | A1 | 8/2015 | Lee et al. | |
| 2016/0049831 | A1* | 2/2016 | Nakano | H04B 10/07955 307/104 |
| 2017/0116443 | A1* | 4/2017 | Bolic | G06K 7/10158 |
| 2018/0123403 | A1* | 5/2018 | Kare | G01S 17/89 |
| 2018/0136335 | A1 | 5/2018 | Kare et al. | |
| 2018/0210081 | A1* | 7/2018 | Haag | F41A 17/08 |
| 2019/0052128 | A1* | 2/2019 | Van Wageningen | H02J 50/60 |
| 2019/0064353 | A1* | 2/2019 | Nugent, Jr. | H02J 50/60 |
| 2020/0403457 | A1* | 12/2020 | Nydell | H01L 31/02024 |
| 2021/0249824 | A1* | 8/2021 | Sparrow | H02J 50/12 |
| 2022/0224170 | A1* | 7/2022 | Nugent, Jr. | H02J 50/90 |

* cited by examiner

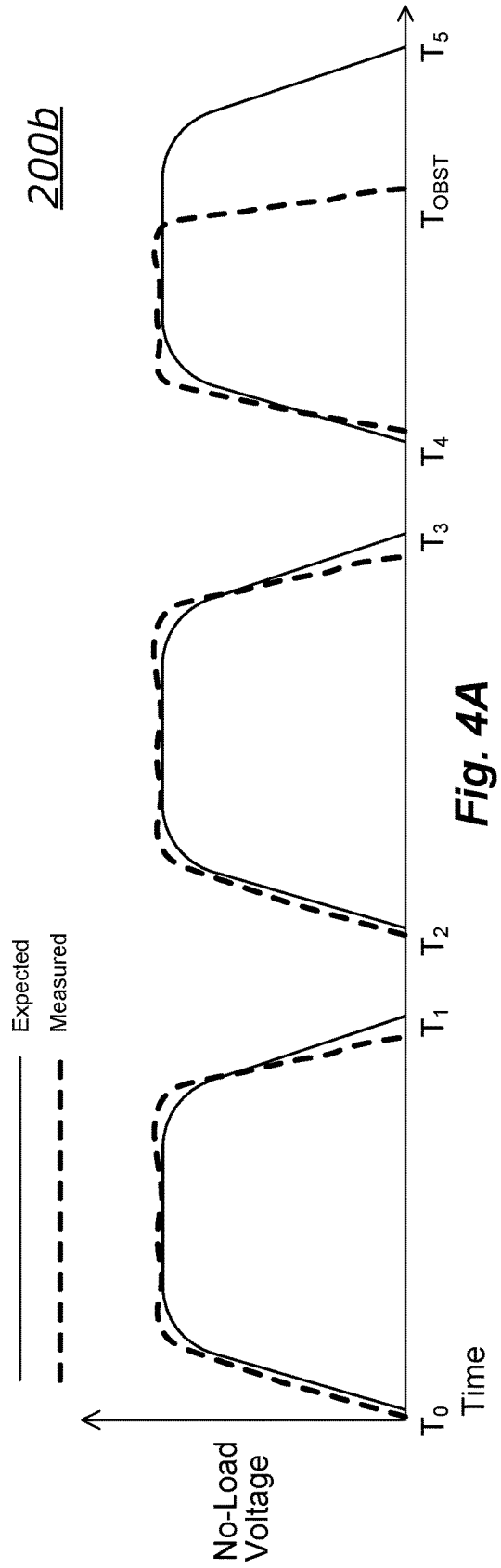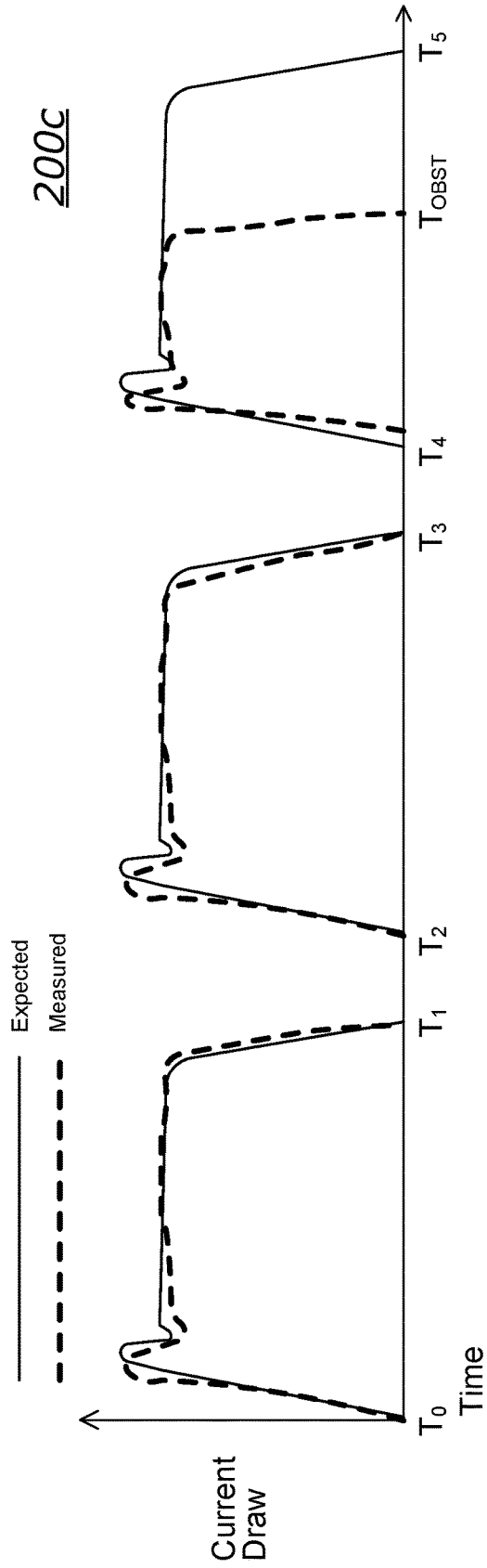

SAFE POWER BEAM STARTUP

CROSS-REFERENCE TO RELATED APPLICATION

This application claims benefit under 35 U.S.C. § 119(e) of U.S. Provisional Patent Application No. 62/851,033, filed May 21, 2019, which is incorporated herein by reference to the extent not inconsistent herewith.

BACKGROUND

Some aspects of technologies and related art that may be useful in understanding the background of the present disclosure are described in the following publications:
- Published U.S. Patent application 2014/0318620 A1 of Kare et al., which describes a device for converting electromagnetic radiation into electricity;
- Published International Patent Application WO 2016/187328 A1 of Kare et al., which describes a power beaming vertical cavity surface emitting laser (VCSEL);
- Published International Patent Application WO 2016/187330 A1 of Kare et al., which describes a power beaming diffusion safety system;
- U.S. Pat. No. 10,374,466 of Olsson et al., which describes an energy efficient vehicle with integrated power beaming;
- Published U.S. Patent Application 2019/0064353 A1 of Nugent et al., which describes a remote power safety system;
- U.S. Pat. No. 10,488,549 of Kare et al., which describes a system for locating power receivers;
- U.S. Pat. No. 10,634,813 of Kare et al., which describes a multi-layered safety system;
- Published U.S. Patent Application 2018/0136335 A1 of Kare et al., which describes a diffusion safety system; and
- Published U.S. Patent Application 2018/0136364 A1 of Kare et al., which describes a light curtain safety system.

Each of the above-mentioned documents is incorporated by reference herein to the extent not inconsistent herewith.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

SUMMARY

The following is a summary of the present disclosure to provide an introductory understanding of some features and context. This summary is not intended to identify key or critical elements of the present disclosure or to delineate the scope of the disclosure. This summary presents certain concepts of the present disclosure in a simplified form as a prelude to the more detailed description that is later presented.

The device, method, and system embodiments described in this disclosure improve the safety of a remote power system during activation of a high-flux power beam (e.g., a laser beam). Safety mechanisms that shut off a high-power laser beam before a foreign object can enter the high intensity beam are known in some remote power systems, but there is a need to more safely turn on the high-power beam. Such a system may, as described herein, detect beam obstructions before the high-flux power beam is engaged.

The present disclosure teaches startup power monitoring (SPM) logic, which may be located at the power receiver, at the power transmitter, or elsewhere in the system. The SPM logic determines whether or not it is safe for the remote power transmitter to enable the high-flux power beam. When the SPM logic determines that the path between the receiver and the transmitter is clear, the SPM logic signals this "safe" condition to the transmitter. When the SPM logic is located at the receiver, the signaling by the SPM logic to the transmitter may be implemented using portions of the remote power system's active safety mechanism.

As part of the high-flux power beam start-up process, the transmitter may be arranged to "pulse" the high-flux power beam for a short period at low output power (e.g., an eye-safe and/or tissue-safe power). Correspondingly, the power response of each module or individual photovoltaic (PV) cell, the aggregate response, or the response of selected subgroups of the receiver will be determined. The power response may include voltage measurements, current measurements, temperature measurements, or information generated from some other data source. Based on the generated power response, the SPM logic will determine if the set of PV cells, individually or collectively, are producing a response signal within an expected range. If so, the SPM logic will inform the transmitter that no obstructions were detected. In some cases, the SPM logic may inform the transmitter that the expected peak power per PV cell was received, and in some cases, the SPM logic may inform the transmitter how much power was generated by the entire remote power receiver and/or how much power was generated by individual PV cells or groups of PV cells of the remote power receiver.

Communications of such information from the remote power receiver to the remote power transmitter may be via a signaling mechanism of the remote power system that is also used to turn off the high-flux power beam when an obstruction is detected, or it might be part of a separate communication channel such as a telemetry stream. This signaling mechanism may include emitters (e.g., light-based emitters, RF signal-based emitters, or the like) that communicate binary signals or more complex signals from the remote power receiver to the remote power transmitter. The information communicated may include details regarding which PV cells are receiving acceptable energy input, raw power level data, or some other information. In cases where the power beam remains focused during the startup mode, information associated with individual PV cells may be used by the remote power transmitter to more finely steer the power beam. In at least some cases, the communications may be performed via amplitude modulation of light pulses emitted from a remote power receiver-based transmitter circuit, and this same circuit can be used during normal power modes to indicate to the remote power transmitter that the high-flux power beam is unobstructed.

The power response of the receiver is in some embodiments made using data gathered by a PV cell. Additionally, or alternatively, the power response determination may be implemented with photodiodes, or some other light detection circuitry (e.g., photoresistors).

In various embodiments, the transmitter may operate the power beam source during startup in certain ways. For example, in one embodiment, the transmitter may keep the power beam focused as it would be in regular high-flux power transfer, but operating at a reduced, eye-safe power level. In other embodiments, the transmitter may diverge the power beam to encompass the entire receiver and in some cases, the area around the receiver. In this way, at least some of the energy from the diverged power beam will be received at the receiver, but at any specific point, the power beam energy will be at or below a determined eye-safe level. In such cases, the startup procedure that diverges the power beam may further be used to better aim the power beam at the receiver. In still other cases, the power beam output may be pulsed, and in at least some of these cases, the pattern of pulsing may carry information from the transmitter to the receiver.

During a startup mode, the receiver may also be operated in one or more of several configurations. For example, when the power beam covers a substantial fraction of the power-generating face of the receiver (or the expected fraction of the receiver for normal operation), the SPM logic may determine that the power beam intensity profile across the plurality of PV cells is relatively flat. In this case, when the power output response of each PV cell is within a certain ratio of other PV cells (e.g., within a factor of 2 of each other), the SPM logic may determine that no obstruction is present. In another case, the SPM logic may be configured to identify a difference in overall power (e.g., which may be measured as voltage or current from the individual PV cells or from the array as a whole) when the power beam is on (e.g., pulsed or in a low energy mode) versus when the power beam is not being transmitted.

In some embodiments, during startup mode, the SPM logic will electrically disconnect at least some power regulation circuitry of the remote power receiver or at least some output circuitry. For example, when the receiver is operating in a normal mode and receiving a high-flux power beam, the electrical signal output from each PV cell will be regulated, combined, and delivered to one or more output circuits. In startup mode, however, when one or more PV cells are receiving a reduced amount of flux, the output circuits or even the power regulator circuits may sink all of the current that is available and thereby reduce the output voltage of the PV cell circuits to zero volts or nearly zero volts. To prevent this condition, the SPM logic may sense the lower energy level (e.g., from the diverged and/or pulsed power beam) and disconnect the output circuits or at least some of the power regulation circuitry during startup mode. This electrical disconnection can be performed by a switch operated or otherwise controlled at the direction of the SPM logic. The switch may be defaulted in a "disconnected" state so that power may be accumulated to operate the remote power receiver from the energy delivered during startup mode when no other power is available.

In some embodiments, during startup mode, the SPM logic may electrically divert at least some energy produced by some or all of the PV cells. In these cases, the diverted energy may be used to power the SPM logic and a communication circuit. The diverted energy may be accumulated in an electrical power storage device such as a capacitor circuit or a battery circuit. In at least some cases, the SPM logic may monitor the storage device and perpetually keep the storage device charged during normal, high-flux operations. In at least some cases, the amount of energy diverted may be used in part to determine if the power beam is obstructed.

In still other embodiments, the SPM logic may include sensor circuits associated with each PV cell that generate and report effective power beam intensity. These sensor circuits may monitor PV cell voltage in some cases. In other cases, the sensor circuits may monitor current sourced by a respective PV cell using, for example, a capacitor circuit. In this way, a controller of the SPM logic may be arranged to determine if the power beam is obstructed based on one or more PV cells producing zero output or very low output (e.g., less than 75%, less than 50%, less than 10%, or some other percentage) relative to nearby (e.g., adjacent or nearly adjacent) PV cells.

The SPM logic in some cases will determine and compare total power produced by the remote power receiver to power generated by one or more individual PV cells. In at least some cases, if a small object near the remote power receiver is obstructing the power beam, or if an even smaller object closer to the remote power transmitter, is obstructing the power beam, then comparing power output from adjacent or nearly adjacent PV cells may not easily determine the obstruction due to adjacent PV cells generating similarly reduced power levels. One way to overcome this challenge is to compare the output from an individual PV cell to the output of a plurality of PV cells. For example, if a set of 100 illuminated PV cells produces "X" power, it may be expected that each individual PV cell will produce power of about $\frac{1}{100}$ of "X."

This Brief Summary has been provided to describe certain concepts in a simplified form that are further described in more detail in the Detailed Description. The Brief Summary does not limit the scope of the claimed subject matter, but rather the words of the claims themselves determine the scope of the claimed subject matter.

BRIEF DESCRIPTION OF THE DRAWING

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings as follows.

FIG. 4A is a voltage-over-time graph captured during performance of the SPM logic module when the remote power system is operating in a startup mode.

FIG. 4B is a current-over-time graph captured during performance of the SPM logic module when the remote power system is operating in a startup mode. Collectively, FIG. 4A and FIG. 4B may be referred to herein as FIG. 4.

DETAILED DESCRIPTION

Figure 1A:
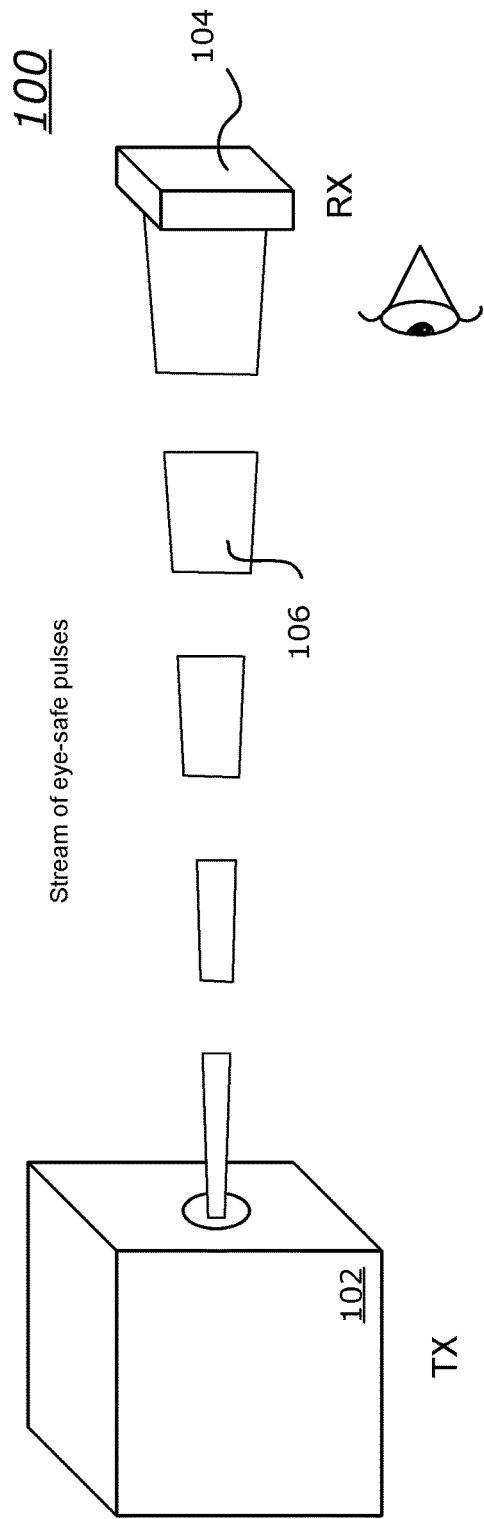
FIG. 1A and FIG. 1B are back-looking and forward-looking views, respectively, of one form of remote power beaming system operating during a safe startup mode. Collectively, FIG. 1A and FIG. 1B may be referred to herein as FIG. 1.

The present disclosure may be understood more readily by reference to this detailed description and the accompanying figures. The terminology used herein is for the purpose of describing specific embodiments only and is not limiting to the claims unless a court or accepted body of competent jurisdiction determines that such terminology is limiting. Unless specifically defined herein, the terminology used herein is to be given its traditional meaning as known in the relevant art.

For clarity of expression, the text below and the several figures of the drawing may refer specifically to PV cells and laser power beams, but the devices, systems, and methods described herein are generally applicable to other power beaming systems that involve transmission of electromagnetic power as energy (e.g., magnetrons and rectennas).

The terms "power beam," "high-flux power beam," and the like are used interchangeably, in all their grammatical forms, throughout the present disclosure and claims to refer to a high-flux light transmission that may include a field of light, that may be generally directional, and that may be arranged for steering/aiming to a suitable receiver. The power beams discussed in the present disclosure include beams formed by high-flux laser diodes, fiber lasers, or other like sources sufficient to deliver a desirable level of power to a remote receiver without passing the power over a conventional electrical conduit such as wire.

In the present disclosure, the term "light," when used as part of a light-based transmitter or a light-based receiver, refers to a transmitter or receiver arranged to produce or capture, as the case may be, electromagnetic radiation that falls within the range of frequencies that can be directed (e.g., reflected, refracted, filtered, absorbed, captured, and the like) by optical or quasi-optical elements, and which is defined in the electromagnetic spectrum spanning from extremely low frequencies (ELF) through gamma rays, and which includes at least ultraviolet light, visible light, long-, mid- and short-wavelength infrared light, terahertz radiation, millimeter waves, microwaves, and other visible and invisible light.

In the present disclosure, the term "flux" means power, and unless context dictates otherwise, it specifically means optical power, such as a selected amount of electromagnetic radiation reaching a receiver where some or all of it may be converted to electrical power.

The device, method, and system embodiments described in this disclosure improve the safety of a remote power system during activation of a high-flux power beam. Safety mechanisms that shut off a high power laser beam before a foreign object can enter the high intensity beam are known in some remote power systems. The present disclosure discusses new devices, methods, and systems that more safely turn on the high power laser either at initial system power-up or after a safety mechanism has disabled the laser output. Such teaching describes how beam obstructions may be detected before the high-flux power beam is engaged. The present teaching may in some cases use known technologies of remote power transmitters and remote power receivers in new ways.

The terms power beam, high-flux power beam, high energy power beam, and the like are used interchangeably, in all their grammatical forms, throughout the present disclosure and claims to refer to a high-flux light transmission that may include a field of light, that may be generally directional, and that may be arranged for steering/aiming to a suitable receiver. The power beams discussed in the present disclosure include beams formed by high-flux laser diodes or other like sources sufficient to deliver a desirable level of power to a remote receiver without passing the power over a conventional electrical conduit such as wire.

Figure 1B:
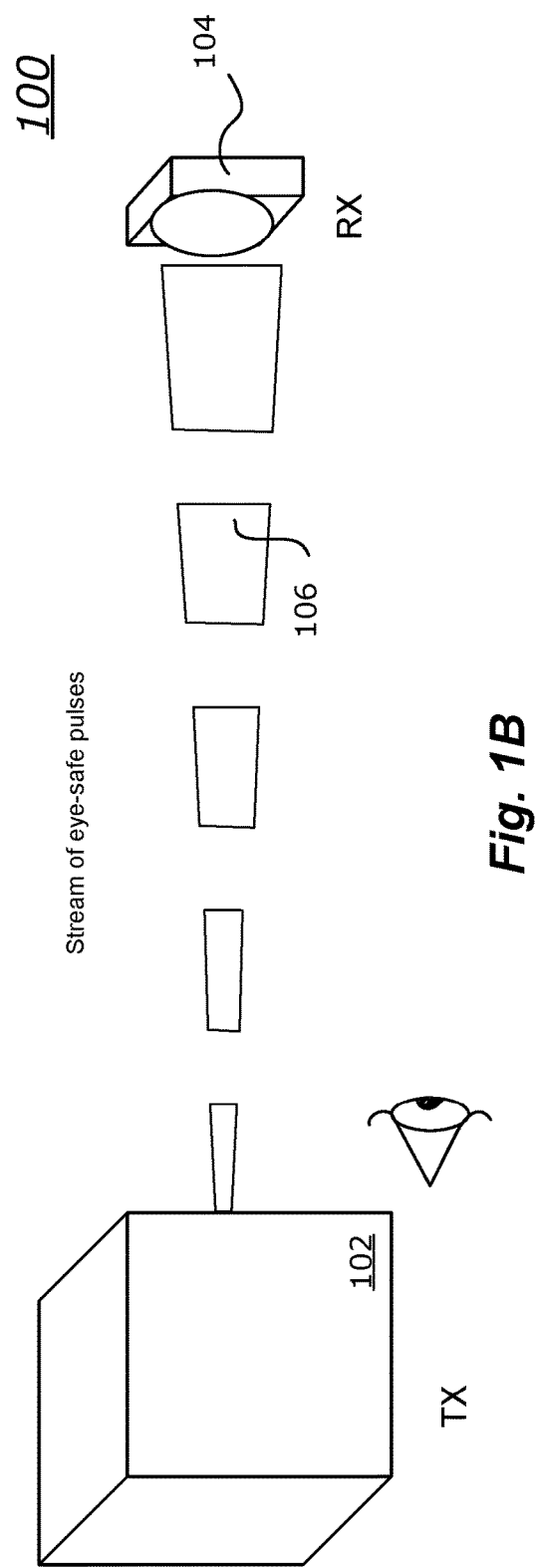

FIG. 1A and FIG. 1B depict one form of remote power beaming system 100 operating during a startup mode. The power beaming system 100, which may also be called a laser power beaming system, an optical remote power beaming system, or some other like term includes at least one transmitter 102 and at least one receiver 104. In FIG. 1A, the power beaming system 100 is viewed from the perspective of the receiver 104 looking back at the transmitter 102. In FIG. 1B, the power beaming system 100 is viewed from the perspective of the transmitter 102 looking toward the receiver 104.

The transmitter 102 of FIG. 1 is a remote power transmitter arranged to output a high-flux power beam 106 (e.g., a high-energy beam of laser light), which is projected through the air or light or some light transmissive medium (e.g., fiber optic cable) over a distance toward the receiver 104. The receiver 104 of FIG. 1 is remote power receiver arranged to receive the high-flux power beam. The receiver 104, which may be in a remote area lacking easily available power (e.g., underwater, on a mountain, on top of a building or other elevated structure, an unmanned aerial vehicle, etc.), includes any number of energy converters (e.g., photovoltaic (PV) cells or rectennas) mounted to capture flux from the high-flux power beam 106. At the receiver 104, the power converters generate electrical energy from energy in the high-flux power beam 106. The electrical energy is then transported to one or more circuits (not shown).

In some cases, the transmitter 102 includes a laser assembly, which converts electric power into optical power (i.e., light), typically but not necessarily in the near-infrared (NIR) portion of the optical spectrum wavelength between 0.7 μm and 2.0 μm. The laser assembly may comprise a single laser or multiple lasers, which may be mutually coherent or incoherent. In some cases, the one or more lasers may be replaced by one or more light emitting diodes (LEDs), super-radiant diodes, a magnetron, or some other high-intensity light source. The light energy output of the laser assembly may pass through any number of optical elements (e.g., optical fibers, lenses, mirrors, etc.) which convert the raw laser light to a beam of a desired size, shape (e.g., circular, rectangular, trapezoidal), power distribution, and divergence. Various elements of the laser assembly may also be arranged to aim the high-flux power beam 106 toward the receiver 104.

After leaving the transmitter 102, the high-flux power beam 106 travels through free space or a light transmissive medium (e.g., fiber-optic cable) toward the receiver 104. The term, "free space," as it is used in the present disclosure, means any reasonably transparent medium such as air or vacuum, water, gas, and the like. Free space is distinguished from a light transmissive solid medium such as an optical fiber, waveguide, or conduit that confines or encloses a high energy light beam or field. Within the present disclosure, a free space or solid medium path may include one or more mirrors, lenses, prisms, or other discrete optical elements that redirect or alter particular characteristics of the high energy light.

At the receiver 104, the high-flux power beam 106 impinges a light reception module (not shown). Energy from the high-flux power beam 106 is captured and converted, at least partly, back to another form of useful power. In some cases, the light reception module includes a plurality of photovoltaic (PV) cells mounted (e.g., an array) to generate electrical power from energy in the high-flux power beam 106. The PV cells in many cases convert light to direct current (DC) electricity. In other cases, the light reception module converts light to electricity in other ways, for example by converting the optical power to heat, which drives a heat engine (e.g., Stirling engine, turbine), a thermoelectric device, or some other device.

In the embodiment of FIG. 1, the remote power system transmitter 102 is operating in a startup mode rather than a high-flux (e.g., "normal") mode. In a startup mode, the high-flux power beam 106 is operating at a power level that is comparatively low (e.g., at or below an ANSI Z136.1 standard regulatory limit, at or below an IEC 60825-1 standard regulatory limit, or at or below another like acceptable limit). The high-flux power beam 106 may be optically diverged, pulsed, operated at a lower flux level, or diminished in some other way that renders the beam eye-safe or meeting certain other eye safety criteria.

Individual pulses of the high-flux power beam 106 in FIG. 1 may be used to communicate information from the remote power transmitter 102 to the remote power receiver 104. The information may be modulated into the light pulses, delivered based on a time-sequence protocol of the light pulses, or embedded in the beam in some other way. The information may include an identifier of the transmitter, an identifier of the receiver intended to receive the information, timing information, scheduling information, parameters related to the delivery of power, or any other desirable information.

Figure 2:
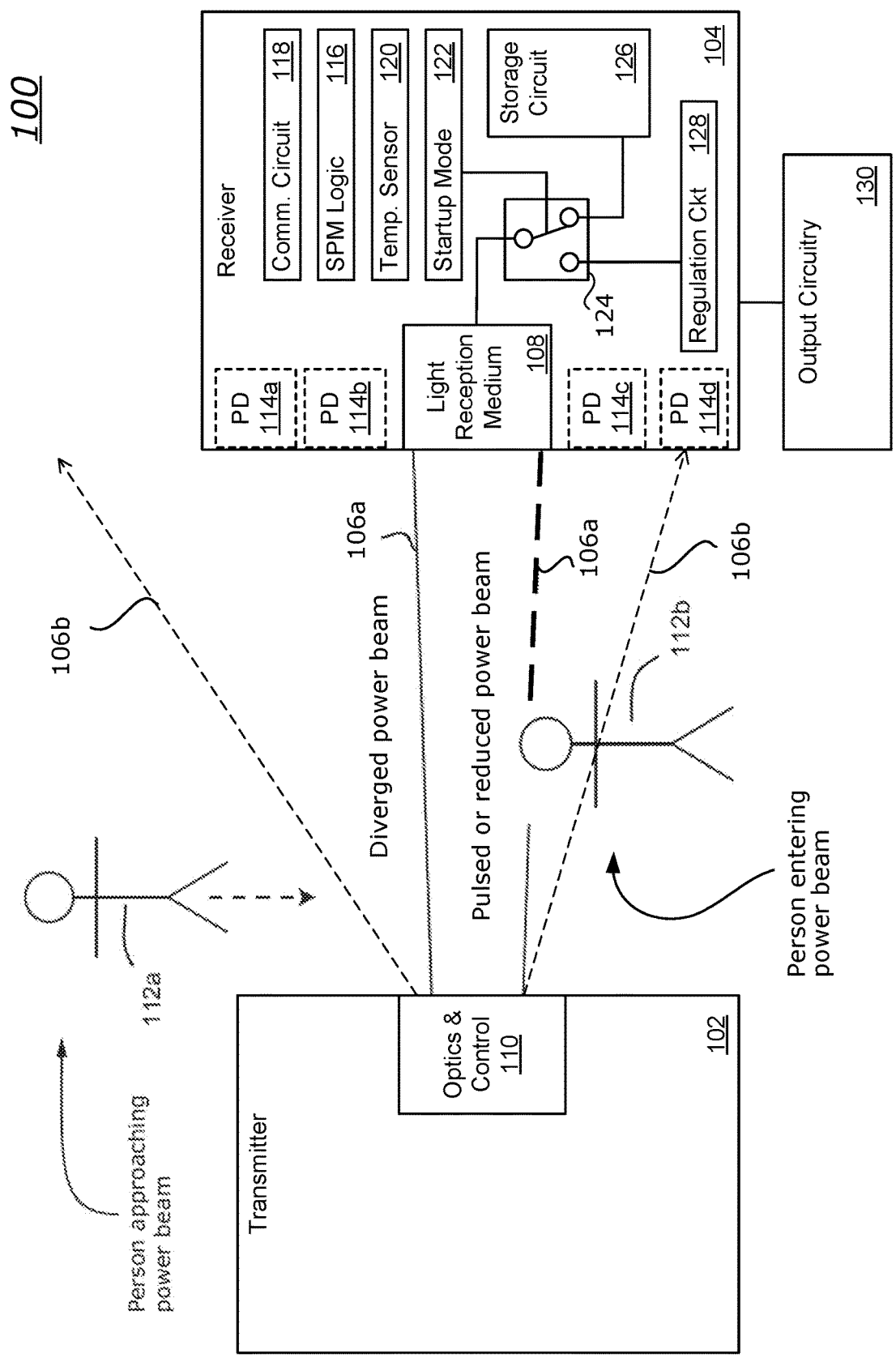
FIG. 2 depicts another embodiment of a safe power delivery power beaming system.

FIG. 2 is another embodiment of the remote power delivery power beaming system 100 of FIG. 1. The remote power transmitter 102 and the remote power receiver 104 are identified. A power beam 106 is identified twice in FIG. 2 as 106a and 106b. In startup operation, the power beam 106a may be focused on a light reception medium 108 of the receiver, or in another startup mode, the power beam 106b may be diverged and generally directed toward the receiver 104.

An optics and control module 110 of the transmitter 102 controls the power beam 106. The power beam may be focused, diverged, aimed, pulsed, or operated with other parameters and characteristics under the direction of the optics and control module 110. The amount of flux transmitted in the power beam 106 is also controlled by the optics and control module 110. The remote power delivery power beaming system 100 of FIG. 2 is illustrated with two power beams 106a, 106b emanating from the transmitter 102. While a single power beam 106 will be sent from the transmitter 102 in actual use, the two power beams 106a, 106b are shown to demonstrate that the transmitter 102 can be configured in many ways during startup mode.

The focused power beam 106a in FIG. 2 operating in a startup mode may have a much lower power component than a high-flux power beam transmitted to deliver a high output power in a non-startup (e.g., high-flux) power mode. The less-focused, divergent power beam 106b may deliver power across a wider field of delivery. Power beam 106a and power beam 106b may be individually or collectively referred to in the present disclosure as power beam 106. Power beam 106a and power beam 106b may meet eye-safe or other tissue-safe criteria. Either or both power beam 106a and power beam 106b may be delivered continuously, periodically, pulsed in a particular pattern, or delivered in some other way.

In the embodiment of FIG. 2, two objects are illustrated. Both of the objects in FIG. 2 are human beings, but any other non-human objects are also contemplated. A first human being 112a is approaching the power beam 106, a second human being 112b is impinging the power beam 106.

In practice, the first human being 112a is not affected by the power beam 106. Detection of the first human being 112a is outside of the scope of the present disclosure.

The second human being 112 has crossed into the field of the diverged power beam 106b and may or may not have crossed into the field of the focused power beam 106a. The flux from the diverged power beam 106b may or may not be detectable by the receiver 104. Depending on the size of the obstruction and where the obstruction occurs in the path between the transmitter 102 and the receiver 104, the obstruction (e.g., an animal such as a bird, an aircraft, human being 112b, or some other obstruction) may or may not be detected by the receiver 104.

In some cases, one or more light-detection circuits such as photodiodes 114a, 114b, 114c, 114d are used to determine when the power beam 106 is obstructed. The photodiodes 114a-114d may be referred to herein as one or a plurality of light-detection circuits 114. The light detection circuits 114 may be arranged at any portion of the receiver 104. In some cases, one or more light detection circuits 114 may be arranged within or adjacent to a plurality of photovoltaic (PV) cells of the light reception medium 108.

In FIG. 2, the impingement of the less focused, diverged power beam 106b may or may not be detected by a particular light-detection circuit. For example, depending on how large the human being 112b is, where in the path between the transmitter 102 and 104 the human being 112b is present, and where light from the power beam 106 strikes the receiver 104, the detection of the human being 112b may be undetected by a specific photodiode 114 or a specific PV cell of the light reception medium 108. On the other hand, imposition of the human being 112b between the transmitter 102 and the receiver 104 may be determined by a startup power monitoring (SPM) logic module 116 of the receiver 104 by monitoring more than one of the photodiodes, PV cells, or other components in the system. For example, the SPM logic module 116 may be able to determine that the expected power output from an array of PV cells of the light reception medium 108 has fallen below a threshold level, and this determination may be assigned to an obstruction in the path between the transmitter 102 and receiver 104.

As discussed in the present disclosure, known remote power safety systems have been developed by the present inventors to detect when an object has impinged or will impinge a high-flux power beam. These systems are not further discussed here, but where such systems are described, the patent documents called out in the present disclosure are incorporated by reference. The present inventors have discovered a new way to deploy portions of such remote power safety systems.

A SPM logic module 116 of the receiver 104 is arranged to collect information from the light reception medium 108 and optionally from other circuits of the receiver 104 and other sources. In some cases, the SPM logic module 116 will collect data from one or more PV cells of the light reception medium 108. The data collection may be continuous, periodical, sporadic, upon command, or at any other desirable time. The data collection may include data from each PV cell, from a collection of PV cells, or from all PV cells. The data that is collected may include peak power data, continuous power data, momentary power data, and the like. The data that is collected may also include voltage measurements, current measurements, power measurements, temperature measurements, and other measurements as desired. In at least some cases, the SPM logic module 116 is arranged to determine, based on signals from one or more plurality of photodiodes 114, whether the power beam 106 is obstructed.

The SPM logic module 116 includes, in at least some embodiments, a receiver-based communication circuit 118. The receiver-based communication circuit 118 may be otherwise used by a known remote power safety system. Additionally, or alternatively, the receiver-based communication circuit 118 may be used at the direction of the SPM logic module 116 to communicate information to the transmitter 102 during a startup mode. The receiver-based communication circuit 118 may be a radio frequency (RF) based transmitter, a light-based transmitter, or a transmitter that performs according to some other communication scheme. Of course, when the SPM logic is located at the receiver and the receiver includes a communication circuit 118, the transmitter 102 will typically have a matching communication circuit (not shown) configured to receive the communication from the receiver 104.

In some cases, the receiver-based communication circuit 118 communicates according to an amplitude modulation (AM) protocol, but it could also communicate another way, such as a frequency-modulated (FM) circuit or an internet connection. When communication circuit 118 uses an AM protocol, information is encoded in the amplitude of the intermediate carrying signal. The amplitude modulation may be conducted in an RF-based transmitter, a light-based transmitter, or a transmitter that operates according to other principles.

In at least some cases of the remote power system 100 operating in startup mode, the presence of a specific signal from the receiver-based communication circuit 118 is treated by the remote power transmitter 102 as an indication that the transmitter 102 can operate in the high-flux mode. In at least some cases of the remote power system 100 operating in startup mode, high-flux mode, or some other mode, the absence of any signal from the receiver-based communication circuit 118 indicates to the transmitter 102 that the power beam 106 is currently obstructed or will imminently be obstructed or other unsafe conditions may exist. In a high-flux mode, the absence of such signal may cause the transmitter to immediately stop transmitting the high-flux power beam. In cases of a startup mode, the transmitter 102 may take another action such as lowering output power, reducing the frequency of pulses, further diverging the power beam, or some other action.

In some cases, the SPM logic module 116 will communicate raw information back to the transmitter 102 via the receiver-based communication circuit 118. The raw information may be associated with total power captured by the receiver 104. Additionally, or alternatively, the raw information may be associated with one or more PV cells, one or more photodetectors 114, one or more temperature sensors 120, or some other raw information. In at least some cases, the information communicated to the transmitter 102 includes power generated by one or more PV cells, and the PV cell or PV cells may in some cases be expressly identified in the information.

In some cases, the SPM logic module 116 will be a module at the receiver 104 that will communicate a binary "YES" signal back to the transmitter 102. In these cases, the SPM logic module 116 will itself determine whether or not there is an obstruction between the transmitter 102 and the receiver 104 rather than, or in addition to, the decision being made at the transmitter 102. Here, the SPM logic module 116 may determine the presence of the obstruction based on total expected power output from the receiver 104, or the SPM logic module 116 may determine the presence of the obstruction based on parameters of individual PV cells or groups of PV cells. To support such determinations, the SPM logic module 116 may have local or networked access to any number of suitable threshold parameters. In such circumstances, for example, the SPM logic module 116 can determine, based on electrical power generated by each of the plurality of PV cells, whether or not the remote power transmitter can operate in a high-flux mode, and if so, the receiver-based communication circuit 118 can be directed to communicate an indication to the transmitter 102 that the transmitter 102 can operate in the high-flux mode. In corresponding ones of these cases, the transmitter 102 will only advance from the startup mode to outputting a high-flux power beam when the binary "YES" signal is received in addition to any other conditions to be met at the transmitter. Until such signal is received, the transmitter 102 will not enter a normal, high-flux power beam output mode.

In other cases, the SPM logic module 116 may be located at the power transmitter 102, or at a third location such as at a central headquarters (not shown) which may be in communication with both power transmitter 102 and power receiver 104. If the SPM logic 116 is not co-located with the power receiver 104, then communication circuit 118 is used to send sensor data to the SPM logic 116 so that it may make the go/no-go decision, wherever it may be located. As a safety measure in such cases, the SPM logic 116 may send a "NO" signal to the power transmitter 102 (or to power receiver 104 for retransmission to power transmitter 102) whenever it is not receiving sensor data, and/or the power transmitter 102 may be configured not to turn on in high-flux mode whenever it does not receive a "YES" signal from the SPM logic 116.

The remote power receiver 104 includes startup mode logic 122 electrically and communicatively coupled to a control line of switching circuit 124. Additional inter-coupling of the various modules of the remote power receiver 104 is understood by one of skill in the art and not shown to avoid unnecessarily confusing the figure.

When the remote power receiver 104 is in startup mode, the startup mode logic 122 will direct various operations and circuits. In one case, for example, the startup mode logic 122 will direct operations of the SPM logic module 116. In this control, the startup mode logic 122 may provide power parameters or other power related information (e.g., threshold values, expected values, timing values, voltage values, current values, temperature values, and the like) and other such information used by the SPM logic 116 to determine if the path between the remote power transmitter 102 and the receiver 104 is obstructed. In other cases, as described herein, the remote power receiver 104 will provide information to the remote power transmitter 102, and the remote power transmitter 102 will determine if the path between the remote power transmitter 102 and the receiver 104 is obstructed.

Additionally, the startup mode logic 122 may control a switching circuit 124, which directly or indirectly couples the power output from the light reception medium to either a local remote power receiver storage device 126 or to regulation circuitry 128 and output circuitry 130. Other switching circuits, which are not shown, are of course included in the remote power receiver 104.

During startup mode, the remote power receiver 104 may not have any available power for on-board circuitry. In some embodiments, switching circuit 124 is arranged during the startup mode to electrically disconnect output circuitry 130 that is coupled to the remote power receiver 104. In at least some of these cases, the switching circuit 124 is defaulted to electrically disconnect the directly or indirectly coupled regulation circuitry 128, output circuitry 130, and other circuitry that is coupled to the remote power receiver 104. The circuitry that is disconnected is generally circuitry that is not necessary to determine if there is an obstruction between the remote power transmitter 102 and the remote power receiver 104. In the startup mode, the switching circuit 124 may directly or indirectly couple the output of the light reception medium 108 to the storage device 126. In this way, ambient light may be used to charge the storage device 126 when the remote power system 100 is not operating. Additionally, or alternatively, a reduced flux power beam 106, a diverged power beam 106, or a pulsed power beam 106 may be used to add power to the storage circuit 126. When sufficient power exists in the storage circuit 126, certain circuits (e.g., light reception medium 108 circuits, photodiode 114 circuits, SPM logic module 116 circuits, communication circuits 118, temperature sensor 120 circuits, and the like) are powered, while other circuits are not powered.

In still other cases, only some power from the light reception medium 108 may be diverted to the storage circuit 126. Such conditions may occur when the receiver 104 is operating in a high-flux mode. Such conditions may also occur in some embodiments of a startup mode where a portion of the generated power is also applied to other circuits. Generally speaking, it is desirable for the storage circuit 126 to retain at least some level of power when the receiver 104 is not actively receiving a high-flux power beam 106 from the remote power transmitter 102. In some of these or other cases, the storage circuit 126 may be configured to receiver power from a different storage device (e.g., an uninterruptible power supply (UPS)) that is implemented by the external load for use during interruptions or other stoppage of the high-flux power beam.

Figure 3:
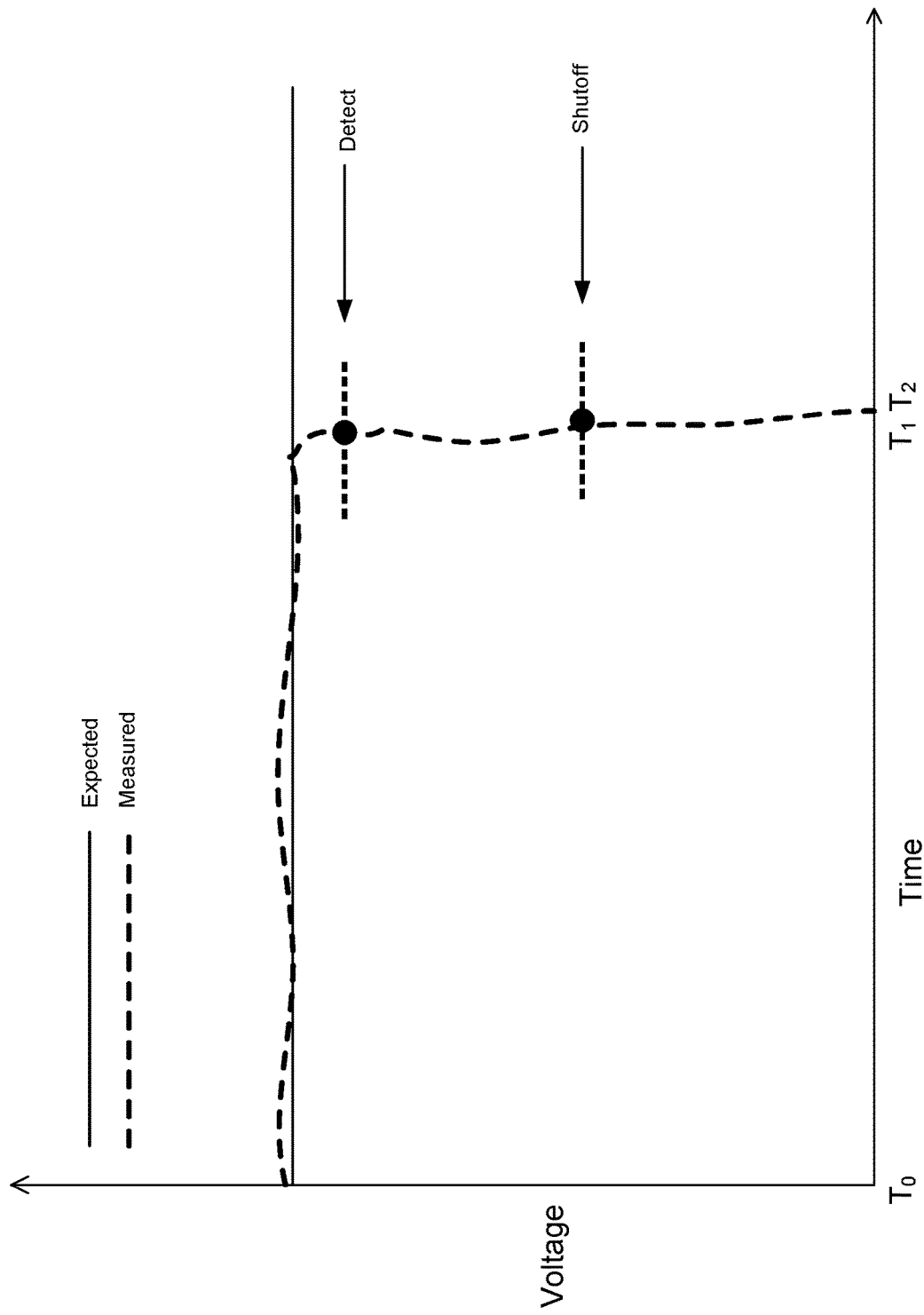
FIG. 3 is a voltage-over-time graph captured during performance of the startup power monitoring (SPM) logic module.

FIG. 3 is a voltage-over-time graph 200a captured during performance of the startup power monitoring (SPM) logic module 116. The remote power system 100 may be operating during startup mode, high-flux (i.e., "normal") mode, or some other operating mode. Within the remote power system 100, the SPM logic module 116 is arranged to measure power parameters from each PV cell, from a group of PV cells, from an entire array of PV cells, or any combination thereof. In the graph of FIG. 3, a predicted voltage of any selected grouping is represented as a steady state voltage line. Some known PV cells output power at a voltage of eight tenths of a volt (0.8 v), two and one-half volts (2.5 v), 10 volts (10 v), 24 volts (24 v), or any other suitable voltage level. Individual PV cells may be wired to other PV cells in series, parallel, or both series and parallels combinations. Accordingly, a receiver 104 may comprise any plurality of PV cells formed in any suitable groups, clusters, arrays, pseudo-arrays, or any other configuration.

The graph of FIG. 3 may represent voltage measured at the direction of the SPM logic module 116 for one PV cell, a group of PV cells, an array of PV cells, or all PV cells of the receiver 104. A steady-state voltage was predicted, which is indicated by the solid line in FIG. 3. At time T1, however, the SPM logic detected a voltage drop. At time T2, having sensed that the voltage dropped below a determined threshold, the SPM logic module 116 directs the remote power transmitter 102 to shut off the power beam.

In at least some cases, the SPM logic module 116 will send information (e.g., power parameters of a single PV cell, multiple PV cells, or any other type of information) to the remote power transmitter 102 continuously. In other cases, the SPM logic module 116 will send information periodically or according to a determined schedule. In still other cases, the remote power receiver 104 will determine when information is sent to the remote power transmitter 102. In the case of the graph of FIG. 3, the detection of the dropping voltage and the determination of the shutoff threshold being crossed will cause the SPM logic module 116 to send or to stop sending an appropriate transmission to the transmitter 102.

FIG. 4A is a voltage-over-time graph 200b captured during performance of the SPM logic module 116 when the remote power system 100 is operating in a startup mode. FIG. 4B is a current-over-time graph 200c captured during performance of the SPM logic module 116 when the remote power system 100 is operating in a startup mode. Because both output voltage and output current are components in a power calculation of a remote power receiver, the two graphs may collectively be referred to as power-parameter or power-related graphs of FIG. 4.

The power-related graphs of FIG. 4 represent at least one embodiment of data captured when the remote power system 100 is operating in a startup mode. The power beam 106 may be operating in a reduced power condition and in addition, or in the alternative, the remote power system transmitter 102 may have diverged (i.e., spread out) power beam 106 into a state that covers the entire receiver 104 (e.g., power beam 106a in FIG. 2) or even the space beyond the entire receiver (e.g., power beam 106b in FIG. 2). In the power-related graphs of FIG. 4, the SPM logic module 116 will continuously, periodically, or at some other point monitor voltage, current, temperature, or some combination of these and other power-related parameters. The no-load voltage of FIG. 4A is measured, for example, when the regulation circuitry 128 and output circuitry 130 is disconnected from the light reception medium 108 by the switching circuit 124. In FIG. 4B, the current draw measurement may be taken when any one or more of the regulation circuitry 128, output circuitry 130, startup mode circuitry, or the like is connected to the light reception medium 108. In these cases, the SPM logic module 116 may be comparing measured point values (i.e., voltage or current values as the case may be) to expected (e.g., threshold) values.

The expected values used by the SPM logic module 116 may be stored in a table or some other memory structure of the remote power receiver 104 (or in another location if the SPM logic module 116 is not co-located with the power receiver 104). In other cases, the expected values may be predicted according to a model or derived in some other way. In some cases, the remote power receiver 104 or the SPM logic module 116 stores such values in memory. In other cases, the remote power receiver 104 receives such values from a remote source (e.g., the Internet, the remote power transmitter 102, or some other network). In at least one case, the remote power transmitter 102 will communicate information to the remote power receiver 104 via a pulsed power beam 106. Here, the information in the pulses may be used by the SPM logic module 116 to calculate, predict, or otherwise determine appropriate expected power-related values. For example, the information communicated by the remote power transmitter 102 may include wavelength, frequency, timing information, output power information, distance (e.g., distance between the transmitter 102 and the receiver 104), weather conditions, or any other relevant information.

In the power-related graphs of FIG. 4, it is evident that the remote power receiver 104 is receiving expected power beam 106 pulses at times T0, T1, T2, T3, and T4. Prior to the conclusion of time between T4 and T5, however, an event occurs at $T_{OBST}$. The event may be impingement of the power beam 106 by the human being 112b entering the power beam 106. In some cases, as in the embodiment of FIG. 4, an expected pulse may be truncated. In other cases, which may be more common, one or more expected pulses will fail to be detected, and the absence of detection will serve as an indication of obstruction.

Figure 5:
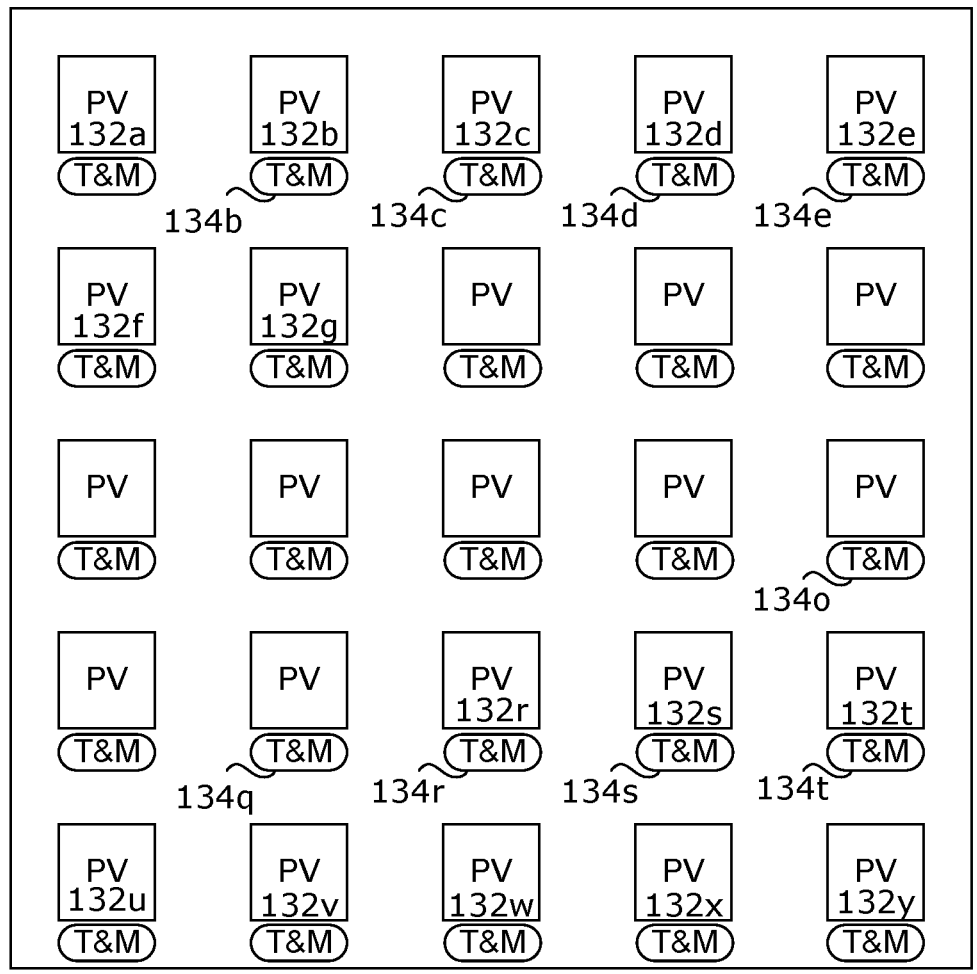
FIG. 5 depicts an embodiment of a light reception medium.

FIG. 5 is an embodiment of a light reception medium 108a. The light reception medium 108a is of the type that may be employed in the remote power systems 100 taught herein (FIG. 1 and FIG. 2). In the embodiment, a plurality of photovoltaic (PV) cells 132a-132y are formed. Also in the light reception module 108 embodiment, a plurality of temperature and measurement modules 134a-134y are formed. Individually or collectively, the PV cells 132a-132y may be referred to as PV cells 132. Individually or collectively, the temperature and measurement modules 134a-134y may be referred to as temperature and measurement modules 134. In FIG. 5, to avoid over-cluttering the figure, only some PV cells 132 and only some temperature and measurement modules 134 are identified.

The PV cells 132 may be PV cells as described in the present disclosure. The PV cells may be known PV cells 132 implemented and organized by the inventors in other known ways. In some cases, individual PV cells 132 are identified, and power and other information is captured on a per-PV cell basis. In these and other embodiments, PV cells 132 are formed into groups, clusters, or other sets. For example, a row of PV cells 132 may be considered, a column of PV cells 132 may be considered, a quadrant (e.g. four PV cells or one fourth (¼) of the PV cells in a receiver 104) of PV cells 132 are considered, or some other group of PV cells 132 may be considered. In these or still other cases, all of the PV cells 132 in a remote power receiver 104 are considered. In some cases, such as in the embodiment of FIG. 5, the PV cells 132 are formed as an array. In other cases, PV cells 132 may be formed in a different configuration. For example, if PV cells 132a, 132e, 132u, and 132y are eliminated, then the array of PV cells 132 will more closely approximate a circle. Such a configuration may more closely represent area of coverage of a high-flux power beam 106. This "rounded" configuration, and other desirable configurations, are contemplated to improve efficiency, cost-effectiveness, low power usage during a startup mode, weight, and many other factors.

In some embodiments, at least one temperature and measurement module 134 is formed in close proximity to each PV cell 132. In other embodiments, one temperature and measurement module 134 may be formed in proximity to a plurality (e.g., two, four, sixteen, or some other number) of PV cells 132. The temperature and measurement modules 134 may be arranged in proximity to one or more PV cells to better assess the PV cell efficiency of power-related parameters (e.g., voltage, current, and the like) with respect to temperature. In these and other cases, the temperature and measurement modules 134 may be physically, thermally, or otherwise coupled to one or more PV cells 132. Such proximity may enable more efficient and accurate power-related measurements, more accurate temperature measurements, and more efficient power utilizations. In at least some cases, each temperature and measurement module 134 includes any one or more of a microcontroller, memory that stores software instructions executed by the microcontroller, memory that stores data, communication circuitry, electrical measurement circuitry (e.g., regulation circuitry, load circuitry, storage circuitry, filtering circuitry, comparison logic circuitry, and other circuitry). In at least some cases, the photodiodes 114 of FIG. 2 are embodied in the temperature and measurement modules 134. In at least some cases, the temperature sensors 120 of FIG. 2 are embodied in the temperature and measurement modules 134.

The SPM logic module 116 cooperates with the temperature and measurement modules 134. In some cases, the SPM logic module 116 of the remote power receiver 104 is arranged to determine whether or not it is safe for the remote power transmitter 102 to exit the startup mode and operate in a high-flux mode. In one embodiment, the SPM logic module 116 determines if the generated electrical power from each of the plurality of PV cells 132 is within an expected range. Such measurements can be made by measuring both voltage and current of each selected PV cell 132. In one embodiment, the SPM logic module 116 determines if the generated electrical power from each of the plurality of PV cells 132 is within an expected range by measuring voltage produced by each of the plurality of PV cells; and in one embodiment, the SPM logic module 116 determines if the generated electrical power from each of the plurality of PV cells 132 is within an expected range by measuring current sourced by each of the plurality of PV cells 132. In still other cases, the SPM logic module 116 is arranged to determine if the remote power transmitter 102 can operate in the high-flux mode based at least in part on a plurality of temperature measurements drawn from temperature sensors 120. In such cases, temperature that is above a selected threshold, temperature that is below a selected threshold, or temperature in the vicinity of one PV cell 132 relative to another nearby (e.g., adjacent, separated by one other PV cell 132, or some other distance) PV cell 132 may be used to determine whether or not the transmitter 102 should be permitted to enter a high-flux mode.

Figure 6A:
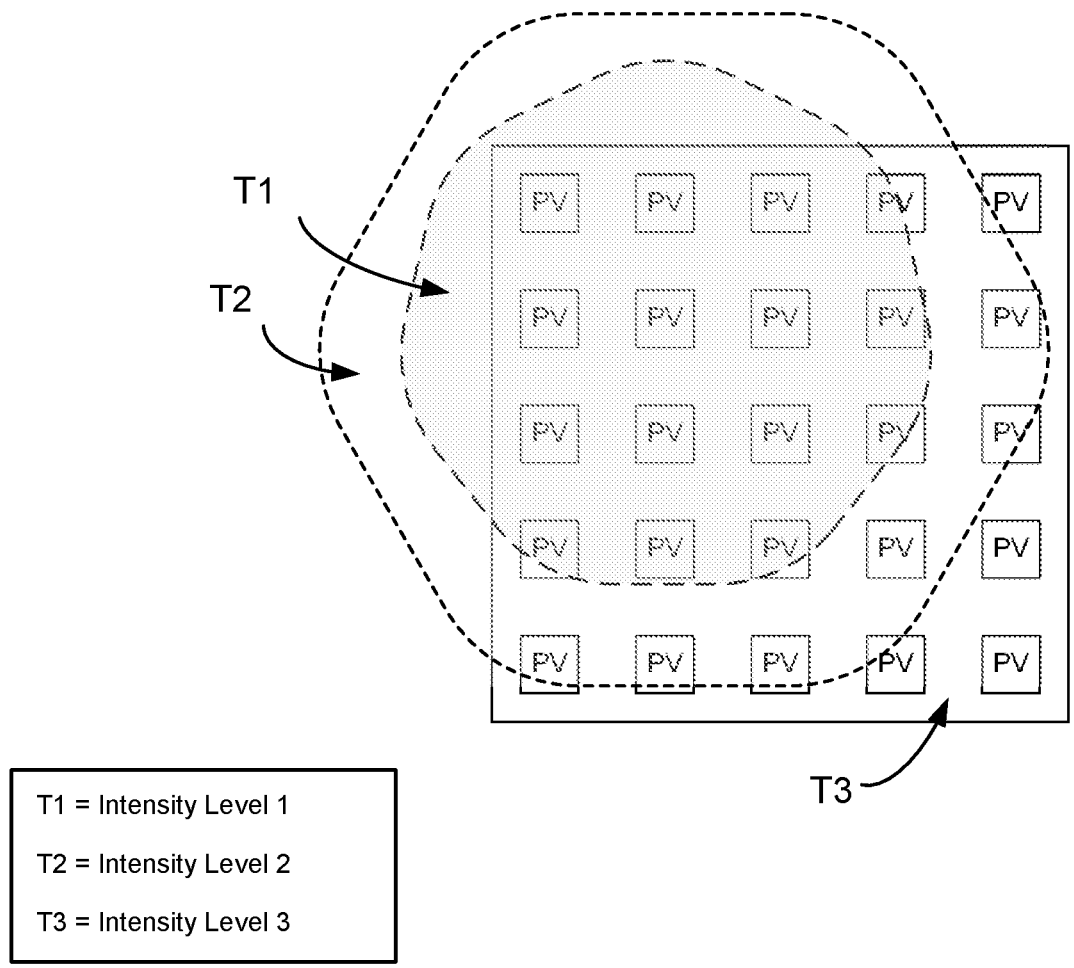
FIG. 6A and FIG. 6B depict embodiments of a light reception medium during different modes of operation of the safe power delivery power beaming system. Collectively, FIG. 6A and FIG. 6B may be referred to herein as FIG. 6.
Figure 6B:
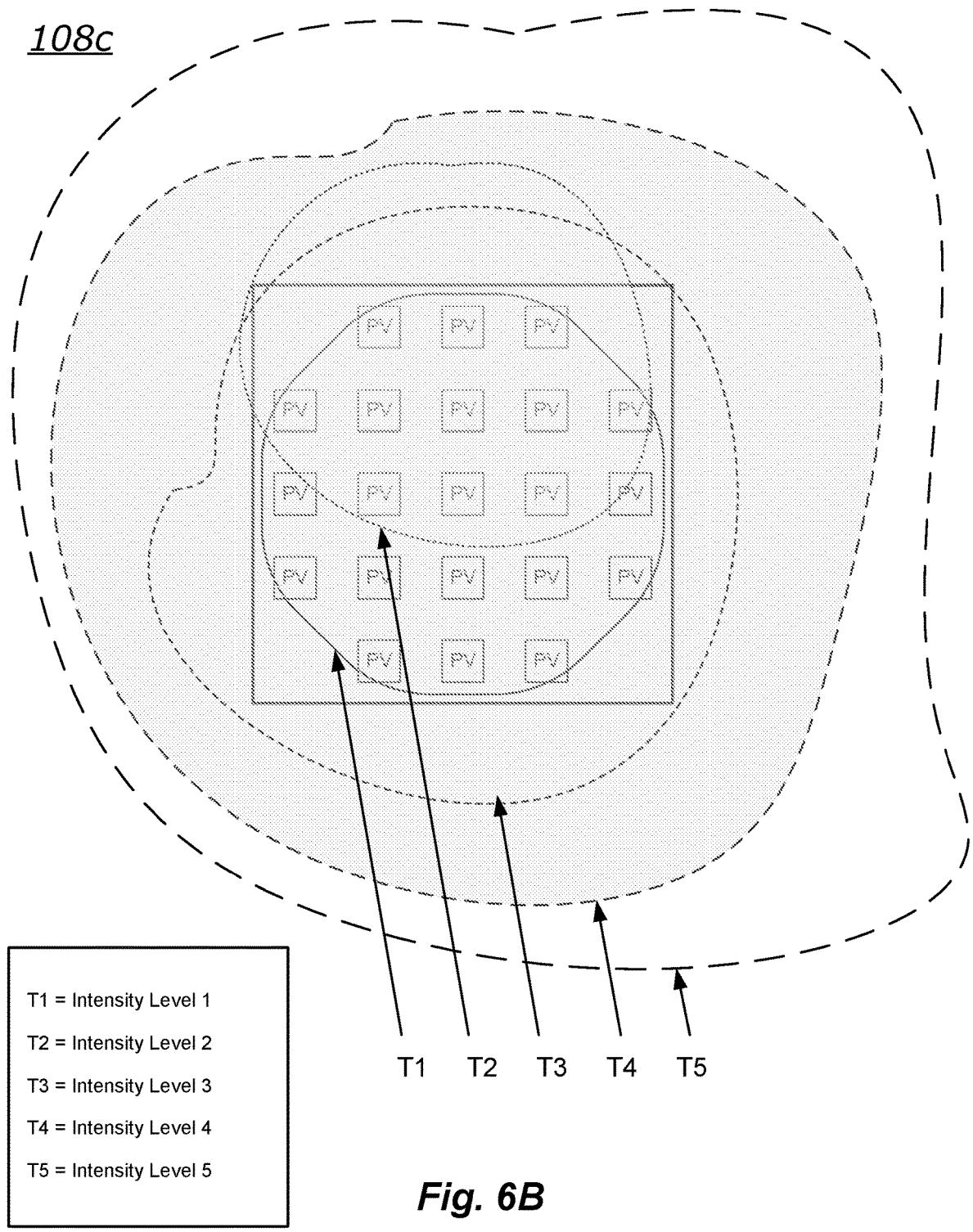

FIG. 6A and FIG. 6B depict embodiments of a light reception medium. The light reception medium 108b and the light reception medium 108c are of the type that may be employed in the remote power systems 100 taught herein (FIG. 1 and FIG. 2).

In FIG. 6A, a plurality of PV cells are represented. The plurality of PV cells in FIG. 6A may be along the lines of PV cells 132a-132y in FIG. 5. In different embodiments, more or fewer PV cells may be included in a light reception medium 108b. In FIG. 6B, a different plurality of PV cells are represented. The plurality of PV cells in the light reception module 108c of FIG. 6B may also be along the lines of PV cells 132a-132y in FIG. 5. In FIG. 6B, however, certain PV cells 132 have been removed so that the plurality of PV cells more closely approximates a circular pattern. In still other embodiments, more or fewer PV cells may be included, and the included PV cells may form any desirable shape. In different embodiments, more or fewer PV cells may be included in a light reception medium 108b. In at least some cases, the light reception modules 108b, 108c include one or more temperature and measurement modules 134 (not shown in FIG. 6).

As evident in FIG. 6, various patterns of power beam 106 flux intensity strike the light reception modules 108b, 108c at the same times or at different times. A highest level of intensity T1 may strike some number of PV cells, and second level of intensity T2 may strike a different plurality of PV cells. A third level of flux intensity T3 is represented in FIG. 6A and FIG. 6B, and fourth and fifth levels of intensity T4, T5, respectively, are represented in FIG. 6B.

The various levels of flux intensity T1-T5 may be caused by aiming of the power beam 106, fluctuating power of the power beam 106, divergence of the power beam 106, pulsing of the power beam 106, obstruction to the power beam 106, environmental factors in the area of the power beam 106, and for other reasons. By measuring, calculating, or otherwise generating power parameters (e.g., voltage, current, temperature, and the like) at the level of individual PV cells or selected groups of PV cells, the SPM logic module 116 can determine whether or not the remote power transmitter 102 should be permitted to operate in a high-flux mode.

In some cases, for example, a remote power system 100 enters a startup mode. The remote power receiver 104 may start operating with power from a storage device 126, or the remote power receiver 104 may not have any available power. In some cases, the remote power receiver 104 is able to capture some ambient light at intensity level T3 (FIG. 6A) and generate power to store in the storage device 126. This stored power can then be used operate the receiver 104 in a startup mode. Additionally, or in the alternative, the remote power transmitter 106 may begin by transmitting a power beam 106 at intensity level T5 (FIG. 6B).

Considering the embodiment of FIG. 6B, but also applicable to the embodiment of FIG. 6A, the SPM logic module 116 can take a plurality of power-related measurements and communicate information associated with such measurements to the remote power transmitter 102. The information may include power-related measurement data associated with individual PV cells, groups of PV cells, an entire set of PV cells, temperature information, detected obstruction information, or any other suitable information. Based on the information received, the transmitter 102 may adjust output power, divergence, aim, pulse patterns, or any other parameters of the power beam 106. By iteratively cooperating, the remote power transmitter 102 may apply feedback from the remote power receiver 104, and the two devices may work together to determine that the power beam 106 is accurately directed toward the light reception medium 108, and there are no obstructions. In this way, the remote power transmitter 102 can, with improved confidence and safety, output a high-flux power beam 106 toward the remote power receiver 104.

Figure 7:
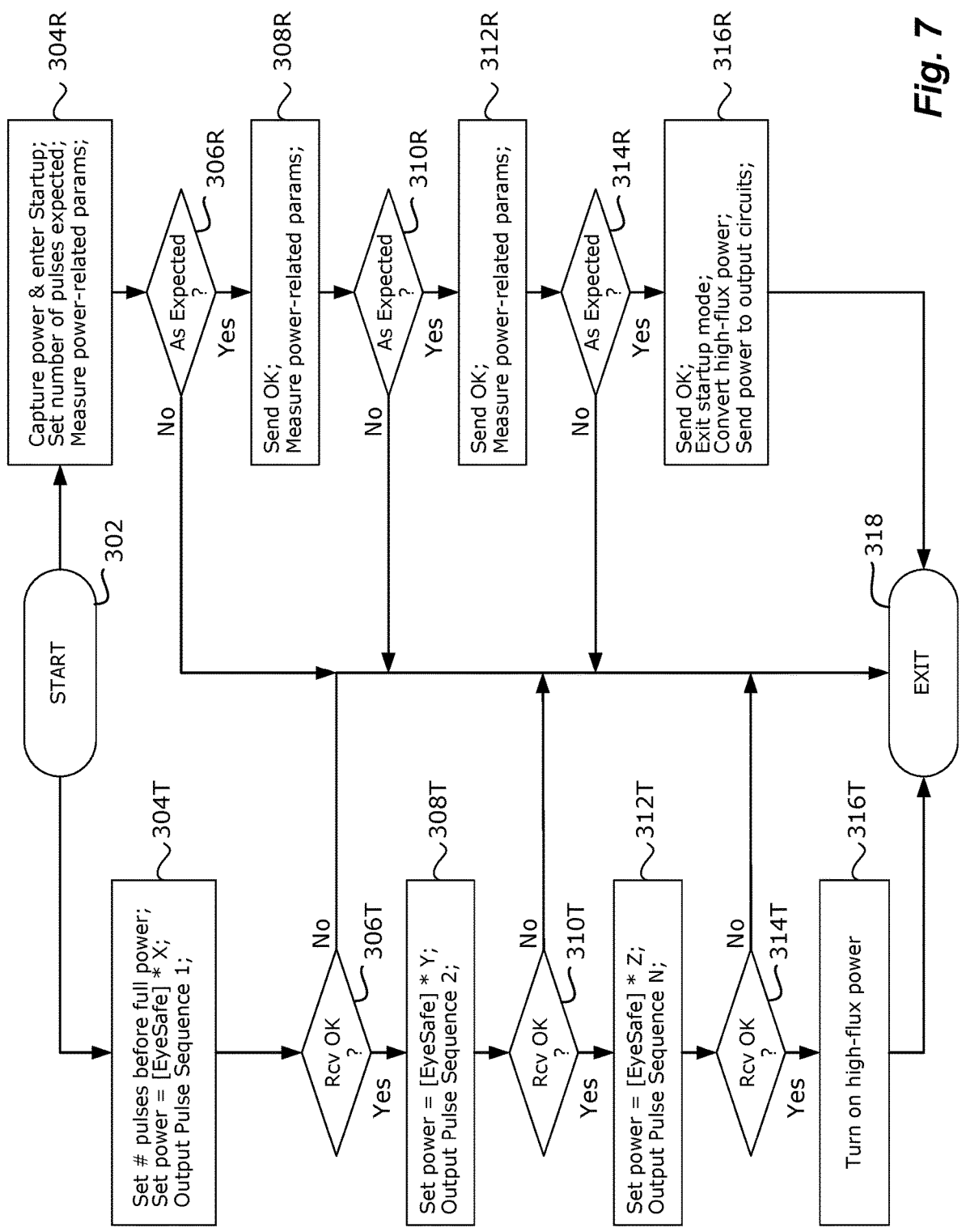
FIG. 7 is a data flow diagram setting out exemplary operations of a remote power transmitter in cooperation with a remote power receiver.

FIG. 7 is a data flow diagram 300 embodiment setting out certain operations of a remote power transmitter 102 in cooperation with a remote power receiver 104. Processing begins at 302.

At 304R, a remote power receiver 104 captures power via a light reception module 108 and optionally stores power in a storage device 126. The power stored in the power storage device 126 may be delivered by the light reception module 108 from ambient light or flux from a previous operation when a high-flux power beam 106 was being transmitted.

Other operations of remote power receiver 104 may also optionally occur at 304R. For example, a switching circuit 124 may couple an output from the light reception module 108 to the power storage device 126 while concurrently decoupling the light reception module 108 from regulation circuitry 128, output circuitry 130, and other circuits and modules that consume power without contributing to a determination of whether or not it is safe to operate the remote power transmitter 102 in a high-flux mode. In some cases, the receiver 104 may perform operations at 304R to initialize a number of power pulses to expect from the transmitter 102, an expected power level, timing information, temperature information, and the like. Other initialization of the receiver in the startup mode may also occur.

At 304R, the remote power receiver 104, via the startup power monitoring (SPM) logic module 116, for example, may also begin capturing power-related parameters from the light reception module 108. The parameters may include voltage, current, temperature, and other such parameters associated with a startup mode.

Concurrent to processing at 304R, a remote power transmitter 102 also begins startup processing at 304T. The remote power transmitter 102 may initialize any number of parameters including a number of pulses to be sent, output power level, aiming information, timing information, and the like. One exemplary parameter that may be initialized by the remote power transmitter 102 is an output power level that is at an eye-safe level. In a first sequence, output power from the remote power transmitter 102 may be reduced to a very low level that is significantly below the eye-safe level (e.g., a determined fraction of possible eye-safe output power such as 25%, 50%, 75%, 90%, or some other appropriate scaling factor).

At 304T, the remote power transmitter 102 outputs a power beam 106. The power beam 106 may be diverged, focused, pulsed, or delivered in some other way. The initial power beam 106 may consist of one or more pulses. Alternatively, the initial power beam 106 may be a steadily output power beam at a particular eye-safe power level.

At the remote power receiver 104, processing at 306R determines whether or not power generated at the light reception module 108 is within acceptable limits. If the power-related parameters measured or otherwise generated by the light reception module 108 are within at an acceptable threshold, or otherwise within acceptable limits, processing falls to 308R, and if not, processing falls to 318. In other embodiments, a failure to detect acceptable power-related parameters may retain processing at 304R or take some other action.

At 308R, the light reception module 108 will communicate an indication to the remote power transmitter 102 that power-related parameters are acceptable and that no obstruction has been detected. The communication from the remote power receiver 104 to the remote power transmitter 102 may include any suitable information such as, but not limited to, power-related information of one or more PV cells 132.

At 306T, the remote power transmitter 102 determines whether or not the remote power receiver 104 has communicated information associated with the power beam 106. The received information may include, but is not limited to, power-related information of one or more PV cells 132. From this information, the remote power transmitter 102 may determine that there is or is not any obstruction between the remote power transmitter 102 and the remote power receiver 104. From this information, the remote power transmitter 102 may also determine that changes to the parameters of the power beam 106 generation (e.g., direction, intensity, focus, divergence, or the like) should be made. In at least some cases, the information received from the remote power receiver 104 will be a binary indication that no obstruction was detected between the remote power transmitter 102 and the remote power receiver 104.

At 306T, the remote power transmitter 102 determines whether or not suitable information has been received from the remote power receiver 104. The suitable information may be whether or not an obstruction has been detected between the remote power transmitter 102 and the remote power receiver 104. If the information indicates that the startup mode may continue, processing advances to 308T, and if not, processing falls to 318. In other embodiments, a failure to receive acceptable power-related information from the remote power receiver 104 will force the remote power transmitter 102 to remain in processing at 306T or take some other action.

At 308T, the remote power transmitter 102 will make adjustments to the power beam 106. The adjustments may include a new eye-safe power setting, a change of direction of the power beam 106, a changed divergence of the power beam 106, a new or continued sequence of pulses of the power beam 106, or some other changes. In this way, in some optional embodiments, the startup mode processing may include a progressive increase in power beam 106 intensity, a progressively finer focusing (e.g., converging) of the power beam 106, a progressively improved aiming of the power beam 106, or some other such iterative startup processing.

Processing in the remote power transmitter 102 advances to 310T.

Based on the changes, additional pulses, or other updates to the power beam 106 made by the remote power transmitter 102 at 308T, processing in the remote power receiver 102 at 308R and 310R measures power-related parameters, and determines whether or not power generated at the light reception module 108 is within acceptable limits. If the power-related parameters measured or otherwise generated by the light reception module 108 are within at an acceptable threshold at 310R, or otherwise within acceptable limits, processing falls to 312R, and if not, processing falls to 318 or other processing in other embodiments.

Along the lines of processing at 308R, the light reception module 108 performing processing at 312R will communicate an indication to the remote power transmitter 102 that power-related parameters are acceptable and that no obstruction has been detected.

At 310T, in correspondence with the transmission from the remote power receiver 102 (at 312R), the remote power transmitter 102 will further determine if an obstruction between the remote power transmitter 102 and the remote power receiver 104 has been detected. If an obstruction is detected, or if some other power-related parameter is unacceptable, or if the communication from the remote power receiver 102 is not received by the remote power transmitter 102, processing falls to 318 or some other processing. Alternatively, if the communications from the remote power receiver 104 are correctly received, and if no obstruction is detected, processing in the remote power transmitter 102 advances to 312T.

At 312T, along the lines of processing at 308T, additional changes may be made to the power beam 106. As evident in the processing sequences of 306T to 314T, and as evident in the processing sequences of 306R-314R, the remote power transmitter 102 is arranged to output a power beam 106 in a startup mode, and the remote power receiver 104 is arranged to provide feedback to the remote power transmitter 102 about the power beam. Any number of desirable iterations, parameter changes, expected or predicted measurements, and the like may be performed by the remote power system 100. In at least some cases, the remote power transmitter may adjust the power beam 106 to deliver the power-related intensity data illustrated in the voltage and current over time graphs 200b, 200c, respectively (FIG. 6).

In processing of the remote power receiver at 316R, the remote power system (i.e., one or both of the remote power transmitter 102 and the remote power receiver 104) has determined that no obstruction is detected between the remote power transmitter 102 and the remote power receiver 104. Accordingly, the remote power receiver 104 will communicate an indication of the "no obstruction" determination to the remote power transmitter 102, and processing in the remote power transmitter 102 will advance through 314T to processing at 316T.

At 316T, the remote power transmitter 102 will begin transmitting a high-flux power beam 106, and the remote power transmitter 102 will exit the startup mode. Continuing processing at 316R, the remote power receiver 104 will exit startup mode and begin converting the high-flux power beam 106 to usable electricity that is passed to output circuitry 130.

Many other optional operations may also occur in the remote power transmitter 102 and the remote power receiver 104 before exiting their respective startup modes at 318. The remote power transmitter 102 may, for example, initiate cooling operations, further test normal-mode safety systems, update data collection parameters, and the like. The remote power receiver 104 may, for example, replace any consumed energy from the storage device 126, disconnect the storage device 126 from the light reception medium 108, enable additional circuitry of the remote power receiver 104 and take other action.

At 318, the remote power transmitter 102 and remote power receiver 104 exit startup mode. The remote power transmitter 102 and remote power receiver 104 may enter a high-flux mode, a normal mode, a shutdown mode, an error mode, or some other suitable mode. In at least some cases, the data flow of FIG. 7 may operate as a single state machine or a plurality of cooperative state machines. For example, a remote power transmitter 102 may operate according to one or more state machines, and a remote power receiver 104 may operate according to one or more state machines, and various states of the remote power transmitter 102 rely on input from various other states of the remote power receiver 104 and vice versa.

FIG. 7 includes a data flow diagram illustrating a non-limiting process that may be used by embodiments of a remote power system 100. In this regard, each described process may represent a module, segment, or portion of software code, which comprises one or more executable instructions for implementing the specified logical function(s). It should also be noted that in some implementations, the functions noted in the process may occur in a different order, may include additional functions, may occur concurrently, and/or may be omitted.

The figures in the present disclosure may illustrate portions of one or more non-limiting computing device embodiments such as one or more components of the optics and control module 110 of the remote power transmitter 102 (FIG. 2) and one or more components of the light reception module 108 of the remote power receiver 104 (FIG. 2). To this end, any such computing devices may include operative hardware found in conventional computing device apparatuses such as one or more processors, volatile and non-volatile memory, serial and parallel input/output (I/O) circuitry compliant with various standards and protocols, wired and/or wireless networking circuitry (e.g., a communications transceiver), one or more user interface (UI) modules, logic, and other electronic circuitry.

The present application discusses several embodiments that include or otherwise cooperate with one or more computing devices. It is recognized that these computing devices are arranged to perform one or more algorithms to implement the inventive concepts taught herein. Each of said algorithms is understood to be a finite sequence of steps for solving a logical or mathematical problem or performing a task. Any or all of the algorithms taught in the present disclosure may be demonstrated by formulas, flow charts, data flow diagrams, narratives in the specification, and other such means as evident in the present disclosure. Along these lines, the structures to carry out the algorithms disclosed herein include at least one processing device executing at least one software instruction retrieved from at least one memory device. The structures may, as the case may be, further include suitable input circuits known to one of skill in the art (e.g., keyboards, buttons, memory devices, communication circuits, touch screen inputs, and any other integrated and peripheral circuit inputs (e.g., accelerometers, thermometers, light detection circuits and other such sensors)), suitable output circuits known to one of skill in the art (e.g., displays, light sources, audio devices, tactile devices, control signals, switches, relays, and the like), and any additional circuits or other structures taught in the present disclosure. To this end, every invocation of means or step plus function elements in any of the claims, if so desired, will be expressly recited.

Unless defined otherwise, the technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

In the present disclosure, when an element (e.g., component, circuit, device, apparatus, structure, layer, material, or the like) is referred to as being "on," "coupled to," or "connected to" another element, the elements can be directly on, directly coupled to, or directly connected to each other, or intervening elements may be present. In contrast, when an element is referred to as being "directly on," "directly coupled to," or "directly connected to" another element, there are no intervening elements present.

The terms "include" and "comprise" as well as derivatives and variations thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the present disclosure, the terms first, second, etc., may be used to describe various elements, however, these elements are not to be limited by these terms unless the context clearly requires such limitation. These terms are only used to distinguish one element from another. For example, a first machine could be termed a second machine, and, similarly, a second machine could be termed a first machine, without departing from the scope of the inventive concept.

The singular forms "a," "an," and "the" in the present disclosure include plural referents unless the content and context clearly dictates otherwise. The conjunctive terms, "and" and "or" are generally employed in the broadest sense to include "and/or" unless the content and context clearly dictates inclusivity or exclusivity as the case may be. The composition of "and" and "or" when recited herein as "and/or" encompasses an embodiment that includes all of the elements associated thereto and at least one more alternative embodiment that includes fewer than all of the elements associated thereto.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

The headings and Abstract of the Disclosure provided herein are for convenience only and do not interpret the scope or meaning of the embodiments.

The term "controller" means any device, system, or part thereof that controls at least one operation, such a device may be implemented in hardware, firmware, or software, or some combination of at least two of the same. The functionality associated with any particular controller may be centralized or distributed, whether locally or remotely. Other definitions of certain words and phrases are provided throughout this patent document. Those of ordinary skill in the art will understand that in many, if not most instances, such definitions apply to prior as well as future uses of such defined words and phrases.

As used in the present disclosure, the term "module" refers to an application specific integrated circuit (ASIC), an electronic circuit, a processor and a memory operative to execute one or more software or firmware programs, combinational logic circuitry, or other suitable components (hardware, software, or hardware and software) that provide the functionality described with respect to the module.

A processor (i.e., a processing unit), as used in the present disclosure, refers to one or more processing units individually, shared, or in a group, having one or more processing cores (e.g., execution units), including central processing units (CPUs), digital signal processors (DSPs), microprocessors, micro controllers, state machines, and the like that execute instructions. The processors interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory or may be hard-coded as a state machine or set of control signals. According to methods and devices referenced herein, embodiments describe software executable by the processor and operable to execute certain ones of the method acts.

In the present disclosure, memory may be used in one configuration or another. As known by one skilled in the art, each memory comprises any combination of volatile and non-volatile, transitory and non-transitory computer-readable media for reading and writing. Volatile computer-readable media includes, for example, random access memory (RAM). Non-volatile computer-readable media includes, for example, read only memory (ROM), magnetic media such as a hard-disk, an optical disk drive, a flash memory device, a CD-ROM, and/or the like. In some cases, a particular memory is separated virtually or physically into separate areas, such as a first memory, a second memory, a third memory, and the like. In these cases, it is understood that the different divisions of memory may be in different devices or embodied in a single memory. The memory may be configured to store data. In the alternative or in addition, the memory may be a non-transitory computer readable medium (CRM) wherein the CRM is configured to store instructions executable by a processor. The instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of the systems, methods, and apparatus described in the present disclosure.

Beamed-power transmission system 100 may further include operative software found in a conventional embedded device such as an operating system, software drivers to direct operations through the I/O circuitry, networking circuitry, and other peripheral component circuitry. In addition, beamed-power transmission system 100 may include operative application software such as network software for communicating with other computing devices, database software for building and maintaining databases, and task management software for distributing the communication and/or operational workload amongst various CPU's. In some cases, beamed-power transmission system 100 is a single hardware device having the hardware and software listed herein, and in other cases, beamed-power transmission system 100 is a networked collection of discrete hardware and software devices working together to execute the functions of the dermal injector. The conventional hardware and software of the beamed-power transmission system is not shown in the figures for simplicity.

Software stored in memory may include a fully executable software program, a simple configuration data file, a link to additional directions, or any combination of known software types. When the beamed-power transmission system 100 updates software, the update may be small or large. For example, in some cases, beamed-power transmission system 100 downloads a small configuration data file, and in other cases, beamed-power transmission system 108 completely replaces all of the functional program instructions in memory with a fresh version. In some cases, the software and data in memory is encrypted, encoded, and/or otherwise compressed for reasons that include security, privacy, data transfer speed, data cost, or the like.

When so arranged as described herein, the beamed-power transmission system is transformed from a generic and unspecific computing device to a combination device comprising hardware and software configured for a specific and particular purpose.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Generally, unless otherwise indicated, the materials for making the invention and/or its components may be selected from appropriate materials such as metal, metallic alloys, semiconductors, ceramics, plastics, etc.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet, including but not limited to [insert list], are incorporated herein by reference, in their entirety. Aspects of the embodiments can be modified, if necessary, to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A remote power system, comprising:
a remote power transmitter configured to output a power beam in a startup mode and in a high-flux mode;
a remote power receiver configured to receive the power beam, the remote power receiver having a plurality of power converters mounted and configured to generate electrical power from energy in the power beam;
startup power monitoring (SPM) logic configured to determine, based on a response of the remote power receiver to a received power beam in startup mode, whether or not the remote power transmitter can operate in the high-flux mode; and
a transmitter circuit configured to communicate an indication by the SPM logic that the remote power transmitter can operate in the high-flux mode,
wherein:
in startup mode, the power beam transmits a finite series of pulses;
the SPM logic compares a response of the plurality of power converters to the finite series of pulses to an expected value to determine whether or not the remote power transmitter can operate in high-flux mode, and
the finite series of pulses is selected to communicate information to the remote power receiver by encoding the information into the beam pulses.

2. The remote power system of claim 1, wherein the power converters are photovoltaic (PV) cells.

3. The remote power system of claim 1, wherein the power beam is a laser beam.

4. The remote power system of claim 1, wherein the SPM logic is co-located with the remote power receiver.

5. The remote power system of claim 1, wherein the SPM logic is co-located with the remote power transmitter.

6. The remote power system of claim 1, wherein the remote power receiver further includes a plurality of photodiodes each positioned proximate to a power converter of the plurality of power converters, and wherein the SPM logic is arranged to determine, based on signals from the plurality of photodiodes, whether the power beam is obstructed.

7. The remote power system of claim 1, wherein the remote power transmitter is configured to output the power beam at or below a selected tissue-safe energy level in startup mode.

8. The remote power system of claim 1, wherein the remote power transmitter is configured to output the power beam by diverging the power beam in the startup mode.

9. The remote power system of claim 1, wherein the SPM logic is configured to determine whether or not the remote power transmitter can operate in a high-flux mode by determining if the generated electrical power from a subset of the plurality of power converters is within an expected range.

10. The remote power system of claim 9, wherein the SPM logic is configured to determine if the generated electrical power from the subset of the plurality of power converters is within the expected range by measuring voltage produced by each member of the subset.

11. The remote power system of claim 9, wherein the SPM logic is configured to determine if the generated electrical power from the subset of the plurality of power converters is within the expected range by measuring current sourced by each member of the subset.

12. The remote power system of claim 1, wherein the SPM logic is configured to determine if the remote power transmitter can operate in the high-flux mode based at least in part on a plurality of temperature measurements.

13. The remote power system of claim 1, wherein the remote power receiver further includes a switching circuit configured to electrically disconnect output circuitry coupled to the remote power receiver during the startup mode.

14. The remote power system of claim 13, wherein the switching circuit is defaulted to electrically disconnect output circuitry coupled to the remote power receiver during startup mode and wherein the switching circuit is directed to electrically connect the output circuitry during a normal operating mode.

15. The remote power system of claim 13, wherein the SPM logic is configured to electrically divert at least some energy produced by at least some of the power converters to power the SPM logic and the receiver-based transmitter circuit during the startup mode.

16. The remote power system of claim 15, wherein the remote power receiver further includes:
an electrical energy storage device configured to store at least some of the diverted energy.

17. The remote power system of claim 1, wherein the indication that the remote power transmitter can operate in the high-flux mode includes information representing power generated by one or more power converters of the plurality of power converters.

18. A method of transmitting power from a transmitter to a receiver including a plurality of power converters, the method comprising:
transmitting a power beam from the transmitter in a startup mode, the startup mode including sending a finite series of pulses of the power beam;
receiving the transmitted power beam at the receiver;
determining whether it is safe to shift to a high-flux mode by determining a response of a subset of the plurality of power converters to the finite pulses of the power beam in startup mode; and
if it is determined that it is safe to shift to a high-flux mode, transmitting an indication of safety to the transmitter,
wherein the finite series of pulses is selected to communicate information to the remote power receiver by encoding the information into the beam pulses.

19. The method of claim 18, wherein the power converters are photovoltaic (PV) cells.

20. The method of claim 18, further comprising transmitting the power beam from the transmitter in a high-flux mode in response to receiving the indication of safety.

\* \* \* \* \*